Patented July 20, 1954

2,684,281

UNITED STATES PATENT OFFICE 2,684,281

PRODUCTION AND USE OF SOLUTIONS OF ACRYLIC POLYMERS

James Lincoln, London, England, assignor to British Celanese Limited, a corporation of Great Britain No Drawing. Application December 22, 1950, Serial No. 202,399

Claims priority, application Great Britain January 5, 1950

20 Claims. (Cl. 18—54)

This invention relates to the production and use of solutions comprising acrylic polymers, and especially to the production of shaped articles such as filaments, films and foils from such solutions.

A class of polymer of increasing importance consists of polyacrylonitrile and copolymers of acrylonitrile with other vinyl compounds; examples of other vinyl compounds are substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. However, polyacrylonitrile and many copolymers containing a high proportion of acrylonitrile are insoluble in the organic liquids commonly employed as solvents, and this constitutes a considerable difficulty in the way of utilising these polymers.

I have now found that fibre-forming polyacrylonitrile, and fibre-forming copolymers of acrylonitrile with other vinyl compounds in which acrylonitrile is the preponderating constituent, can be dissolved in solvent media comprising as the main or only constituent a nitro-alkanol containing 2 or 3 carbon atoms in the molecule, especially 2-nitro-ethanol, and that solutions so obtained are suitable for the production of fibres and films, especially by wet-spinning processes and by casting and like processes in which films or foils are set by means of a liquid coagulating agent.

The invention is of particular value in the formation and use of solutions of polyacrylonitrile itself and of such copolymers of acrylonitrile and other vinyl compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier, or at least, no more difficult, to dissolve in the specified nitroalkanol than is polyacrylonitrile itself, and it will therefore be convenient, in describing the invention in more detail, to refer mainly to polyacrylonitrile.

While the invention includes the use as solvents of the nitro-propanols and nitro-isopropanol, nitro-ethanol is preferred, since it dissolves polyacrylonitrile more easily and gives less viscous solutions than do the nitro-propanols and nitroisopropanol.

The nitro-alkanol may be employed by itself, or it may be diluted to some extent, e. g. with a hydroxyl-containing non-solvent for polyacrylonitrile, especially water, methanol, ethanol, propanol or isopropanol, or with a compound which is itself capable of acting as a solvent for polyacrylonitrile, e. g. a beta-lactone such as propiolactone, a gamma- or delta-lactone such as butyrolactone or gamma- or delta-valerolactone, a cyclic carbonate such as ethylene carbonate, a cyclic anhydride such as succinic anhydride, glutaric anhydride or maleic anhydride, or dimethyl formamide. A non-solvent diluent, if used, is preferably present in amount not more than 20% by volume of the nitro-alkanol; for example nitro-ethanol may be diluted with 5–15% of its volume of water, methanol or ethanol. If the diluent is itself a solvent for the polyacrylonitrile, it may in many cases be present in higher proportions, for example up to 50%.

To effect solution of the polyacrylonitrile in the nitro-alkanol it is in general necessary to employ temperatures exceeding 80° C. Thus polyacrylonitrile may be rapidly dissolved in undiluted nitro-ethanol at temperatures of 90° C. and upwards, e. g. between 90° and 110° C.; if the nitro-ethanol is diluted with 10% of water or ethanol it is better to use rather higher temperatures, especially temperatures between 110° and 130° C., while if methanol is the diluent the polyacrylonitrile dissolves quickly at 100°–120° C. The nitro-propanols and nitro-isopropanol require considerably higher temperatures, namely temperatures between about 150° C. and the boiling point of the solvent; for example, nitroisopropanol diluted with 10% of its volume of water will dissolve polyacrylonitrile at temperatures between 150° and 160° C., while with the undiluted nitro-isopropanol, solution becomes rapid as the temperature approaches 180° C.

The operation of dissolving the polyacrylonitrile in the nitro-alkanol may be carried out in various ways. One very good method is first to heat the nitro-alkanol to the temperature at which solution is to be effected, and then to add the polyacrylonitrile in a form having at least one dimension very small, e. g. in the form of powder or of a thin strip or ribbon, while stirring, kneading or otherwise agitating the mixture. In another method the polyacrylonitrile, again preferably in the form of a powder or a thin strip or ribbon or the like, may be immersed in the solvent at a temperature below the solution temperature, e. g. at room temperature, and the mixture heated to the solution temperature preferably while it is agitated.

Although relatively high temperatures are usually necessary to effect solution of the polyacrylonitrile, the solutions, once formed, provided their concentration is below about 25%, can be cooled considerably without gelling, though their viscosity naturally increases. At the dissolving temperature the solutions obtained are generally clear, and when the solvent is undiluted nitro-ethanol they may remain clear on cooling. If the solvent is a diluted nitro-ethanol, or a nitro-propanol or nitro-isopropanol, diluted or not, cooling is as a rule accompanied by the development of turbidity.

The concentration of the polyacrylonitrile in the solution preferably does not exceed 25%, as otherwise the solutions obtained are exceedingly viscous, even at the dissolving temperature. For most purposes we prefer to use solutions of concentration 5-25% and especially 7.5-20%. As an example of the results obtained, a 10-15% solution in nitro-ethanol is fairly mobile at 110° C., and as it is cooled its viscosity increases until at about room temperature it has the appearance of a colourless jelly. A more concentrated solution is naturally more viscous, and gels at a somewhat higher temperature, while more dilute solutions are less viscous and may remain fluid even at room temperature, at least for some hours.

Solutions of polyacrylonitrile in the specified nitro-alkanols, preferably in nitro-ethanol, may be employed in the production of fibres and films by extrusion or casting methods. For this purpose it is preferable that the solution should be at a fairly high temperature; for example 10%-20% solutions of polyacrylonitrile in nitro-ethanol may be extruded or cast at temperatures above 80° C. and preferably about 90°-120° C. or even higher. When the solution is to be used shortly after its formation, it will generally be most advantageous to maintain it at or near the dissolving temperature, or at least not to allow the temperature to drop below 80° C. between the actual dissolving of the polyacrylonitrile and the extrusion or casting of the solution.

The shaped products are preferably set by means of a coagulating liquid, i. e. by a wet spinning or wet casting method. Suitable agents are water, alcohols, glycols, glycerol, lower alkyl ethers, and esters, especially carboxylic esters of boiling point above 250° C. The coagulating liquid may comprise a proportion, e. g. between about 5 and 25% by volume, of the same nitro-alkanol as is employed as the solvent for the polyacrylonitrile. It may be at about room temperature, but it is preferable that it should be nearer the temperature of the extruded or cast solution, e. g. at a temperature between about 80° and 110° C.; for this reason it is preferable to make use of a coagulating liquid of boiling point substantially above 80° C., e. g. propanol or water or a high boiling ester. If water is used, it may, if desired, contain an alcohol, especially a polyhydric alcohol: thus it may contain glycerol in amount 8-15% of the water. However, to avoid recovery difficulties, it is usually preferable to use the water alone, or with a proportion of the same nitro-alkanol as is used in the spinning solution but otherwise substantially free from organic compounds.

In the production of fibres from polyacrylonitrile and acrylonitrile copolymers in accordance with the invention, the fibres are preferably stretched in order to increase their tenacity. A considerable degree of stretch may be imparted to the fibres in the coagulating bath, but it is preferable that, whether or not they are stretched in the coagulating bath, they should be stretched to several times, e. g. 5-15 times, their length at a later stage. Thus the fibres after leaving the coagulating bath may be wound up and washed (e. g. in the form of multi-filament yarns) and then stretched in hot air, wet steam or water at a temperature above 80° C. or in contact with a hot metal surface, e. g. with the surface of a plate or roller at about 120°-140° C. To obtain a yarn of the highest tenacity it is advantageous to stretch the fibres as soon as possible after coagulation is complete; for example, they may be stretched continuously with their formation, if desired after an intermediate wash with water. If the fibres in a multi-filament yarn show any tendency to stick together or coalesce during the stretching operation, as they may especially when a polymer of low viscosity is employed, this can generally be prevented or minimised by passing the yarn through an aqueous oil emulsion before stretching it, or by carrying out the stretching operation in an aqueous oil emulsion at an elevated temperature, especially at a temperature above 80° C., as described in application S. No. 127,256, filed November 14, 1949. Such an emulsion may contain an oil of animal or mineral origin, but vegetable oils such as olive oil are preferred. The emulsion may contain 1-5% of the oil and may be stabilised by a cationic emulsifying agent, e. g. a higher alkyl pyridinium chloride, for instance in amount 0.5-2% of the emulsion. In most cases it will be found that the best results are obtained by stretching in wet steam, if necessary after passing the yarn through an aqueous oil emulsion. A higher degree of stretch and higher tenacity may be obtained by conducting the stretching in stages as described in application S. No. 127,256, filed November 14, 1949.

When films are made in accordance with the invention, they also may be stretched, preferably in hot air or wet steam or hot water, to increase their tenacity.

Although I prefer to make use of wet-spinning methods of making fibres and of corresponding methods of making films, wherein the solvent power of the nitro-alkanol for the polyacrylonitrile is destroyed by dilution, other methods of setting the solutions after shaping may be used. For example, a nitro-ethanol solution may be extruded into an inert liquid or atmosphere which is sufficiently hot to evaporate the nitro-ethanol and at the same time to convert it partly or wholly into nitro-ethylene, e. g. which is at a temperature as high or higher than the normal boiling point of nitro-ethanol, i. e. above about 190° C. In another method films may be made by an evaporative process under conditions such that the nitro-ethanol is not decomposed to any substantial degree. For example the solution may be cast onto a wheel, band or like casting base which is preferably heated to about 150°-175° C., and evaporation of the nitro-ethanol may be assisted by passing a rapid stream of hot air or other gas over the sheet of solution, preferably at a pressure substantially below atmospheric. The temperature of the air may be above the normal boiling point of the nitro-ethanol, say about 200°-210° C., provided the air carrying the nitro-ethanol vapour is rapidly cooled, preferably to about 100° C. or lower, immediately after leaving the vicinity of the casting surface, so as to condense the nitro-ethanol and cause the minimum of thermal decomposition. Similar methods using a rapid stream of strongly heated evaporative medium, preferably under reduced pressure, which is then rapidly cooled (but of course normally without the use of a heated base) may be applied to the production of fibres.

While the nitro-alkanols are of particular value in the production of solutions of polyacrylonitrile and acrylonitrile copolymers from which fibres and films are to be made by extrusion or casting methods, they can also be used in other liquid or semi-liquid compositions containing these polymers or substituted acrylonitrile polymers or copolymers.

The invention is illustrated by the following examples.

Example I 100 parts by weight of nitro-ethanol was heated to 100° C., and while the hot nitro-ethanol was stirred 10 parts of a powdered fibre-forming polyacrylonitrile was added. The polyacrylonitrile dissolved rapidly to form a clear, colourless and fairly mobile solution, which on being cooled retained its clarity but became more viscous until at room temperature it had the appearance of a colourless jelly.

When 20 parts of polyacrylonitrile was employed, a similar sequence of events occurred, but the viscosity of the solution was higher and gelling set in at a temperature above room temperature.

A fibre-forming copolymer of acrylonitrile (70%) and methacrylonitrile (30%) also dissolved under these conditions.

Example II 10 parts by weight of a powdered fibre-forming polyacrylonitrile was added to 100 parts by weight of a mixture of 90 volumes of nitro-ethanol and 10 volumes of water or ethanol, and the mixture stirred and heated to a temperature of 120° C. At temperatures within the range 110°–120° C. the polyacrylonitrile quickly dissolved forming a clear solution. When this solution was cooled it became much more viscous and also slightly cloudy.

When the water or ethanol was replaced by methanol, the polyacrylonitrile went quickly into solution at temperatures within the range 100°–110° C. When the solution obtained was cooled it lost a little of its clarity, but at a given temperature was clearer than a similar solution containing water in place of the methanol.

Example III 10 parts by weight of powdered fibre-forming polyacrylonitrile was added to 100 parts of nitro-isopropanol and the mixture heated under reflux. At temperatures between 150° C. and the boiling point of the nitro-isopropanol the polyacrylonitrile dissolved forming a fairly clear solution which on cooling become more or less opaque.

If instead of nitro-isopropanol alone there was used the same weight of a mixture of 90 volumes of nitro-isopropanol and 10 volumes of water, solution occurred rapidly in the temperature range 150°–160° C.

Example IV

A solution of a fibre-forming polyacrylonitrile obtained by the method described in Example I or II, but of concentration 12%, was maintained at a temperature of 90°–100° C., and at this temperature was filtered and extruded through a multi-orifice spinning jet into a coagulating bath of water, or water containing 25% of its volume of nitro-ethanol, at 90° C. The filaments produced were drawn through the bath under a tension sufficient to stretch them by about 20%, and were then washed with water and while still wet passed through a chamber containing wet steam at atmospheric pressure wherein they were stretched to about 7 times their original length. Subsequently the filaments were heated to 140° C. while being allowed to shrink to 85% of their stretched length. The filaments so obtained had a good tenacity and extensibility.

Having described my invention, what I desire to secure by Letters Patent is:

1. Compositions comprising a fibre-forming polyacrylonitrile dissolved in a solvent mixture consisting of 2-nitro-ethanol diluted with 5–15% of its volume of a compound of formula ROH, where R is selected from the group which consists of hydrogen, methyl, ethyl, propyl and isopropyl.

2. Process for the production of a solution of a fibre-forming acrylonitrile polymer selected from the group which consists of polyacrylonitrile and acetone-insoluble copolymers of acrylonitrile with another mono-vinyl compound in which acrylonitrile is the preponderating constituent, which comprises maintaining 5–25 parts by weight of the polymer in contact with 100 parts by weight of a mixture of 5–15 volumes of a compound of formula ROH, where R is selected from the group which consists of hydrogen, methyl, ethyl, propyl and isopropyl and 95–85 volumes of a nitro-alkanol containing at most 3 carbon atoms in the molecule at a temperature above 80° C. until the polymer has dissolved.

3. Process for the production of a solution of a fibre-forming polyacrylonitrile, which comprises maintaining 5–25 parts by weight of the polymer in contact with 100 parts by weight of a mixture of 5–15 volumes of a compound of formula ROH, where R is selected from the group which consists of hydrogen, methyl, ethyl, propyl and isopropyl, and 95–85 volumes of 2-nitroethanol at a temperature of 90°–120° C. until the polymer has dissolved.

4. Process according to claim 20, wherein the coagulating liquid contains a minor proportion of the nitro-alkanol used as the solvent for the polymer.

5. Process according to claim 20, wherein the temperature of the solution being shaped exceeds 90° C.

6. Process according to claim 20, wherein the temperature of the coagulating liquid exceeds 60° C.

7. Process for the production of a solution of a fibre-forming acrylonitrile polymer selected from the group which consists of polyacrylonitrile and acetone-insoluble copolymers of acrylonitrile and another monovinyl compound in which acrylonitrile is the preponderating constituent, which comprises maintaining the polymer, at a temperature above 80° C. and until it has dissolved, in contact with a liquid consisting of 2-nitro-ethanol diluted with 5–15% of its volume of a compound of formula ROH, where R is selected from the group which consists of hydrogen, methyl, ethyl, propyl and isopropyl.

8. Compositions comprising a fibre-forming acrylonitrile polymer selected from the group which consists of polyacrylonitrile and acetone-insoluble copolymers of acrylonitrile with another monovinyl compound which contain at least 85% by weight of acrylonitrile, dissolved in a liquid consisting of a nitroalkanol containing at most 3 carbon atoms in the molecule with up to 20%, calculated on the volume of the nitroalkanol, of a diluent of formula ROH, where R is selected from the group which consists of hydrogen, methyl, ethyl, propyl and isopropyl.

9. Compositions according to claim 8, wherein the diluent is present in amount 5–15% of the volume of the nitroalkanol.

10. Compositions according to claim 8, wherein the concentration of the polymer in the solution is 5–25%.

11. Compositions comprising a fibre-forming acrylonitrile polymer selected from the group which consists of polyacrylonitrile and acetone-insoluble copolymers of acrylonitrile with another monovinyl compound which contain at least 85% by weight of acrylonitrile, dissolved in a liquid consisting of 2-nitro-ethanol and up to 20%, calculated on the volume of the nitroethanol, of a diluent of formula ROH, where R is selected from the group which consists of hydrogen, methyl, ethyl, propyl and isopropyl.

12. Compositions according to claim 11, wherein the diluent is present in amount 5–15% of the volume of the 2-nitro-ethanol.

13. Compositions according to claim 11, wherein the concentration of the polymer in the solution is 5–25%.

14. Process for the production of a solution of a fibre-forming acrylonitrile polymer selected from the group which consists of polyacrylonitrile and acetone-insoluble copolymers of acrylonitrile with another monovinyl compound which contain at least 85% by weight of acrylonitrile, which comprises maintaining the polymer in contact with a liquid consisting of a nitroalkanol containing at most 3 carbon atoms in the molecule with up to 20%, calculated on the volume of the nitroalkanol, of a diluent of formula ROH, where R is selected from the group which consists of hydrogen, methyl, ethyl, propyl and isopropyl, at a temperature above 80° C. until the polymer has dissolved.

15. Process according to claim 14, wherein the nitroalkanol contains 3 carbon atoms in the molecule and the polymer is maintained in contact with the liquid at a temperature between 150° C. and the boiling point of the liquid.

16. Process according to claim 14, wherein the nitroalkanol is 2-nitro-ethanol and the polymer is maintained in contact with the liquid at a temperature between 90° and 120° C.

17. Process according to claim 15, wherein 5–25 parts by weight of the polymer are dissolved in each 100 parts by weight of the liquid.

18. Process according to claim 16, wherein 5–25 parts by weight of the polymer are dissolved in each 100 parts by weight of the liquid.

19. Process for the production of fibres and films, which comprises shaping a solution of a fibre-forming polymer selected from the group which consists of polyacrylonitrile and acetone-insoluble copolymers of acrylonitrile with another monovinyl compound which contain at least 85% by weight of acrylonitrile in a liquid consisting of a nitroalkanol containing at most 3 carbon atoms in the molecule with up to 20%, calculated on the volume of the nitroalkanol, of a diluent of formula ROH, where R is selected from the group which consists of hydrogen, methyl, ethyl, propyl and isopropyl, and setting the shaped solution by means of a coagulating liquid.

20. Process according to claim 19, wherein the coagulating liquid is selected from the group which consists of water, alcohols, glycols, glycerol, lower alkyl ethers and high boiling esters.

References Cited in the file of this patent

UNITED STATES PATENTS

| Number | Name | Date |
| --- | --- | --- |
| 2,404,714 | Latham | July 23, 1946 |
| 2,417,293 | D'Alelio | Mar. 11, 1947 |
| 2,417,294 | D'Alelio | Mar. 11, 1947 |
| 2,436,204 | D'Alelio | Feb. 17, 1948 |